United States Patent
Lo et al.

(10) Patent No.: US 7,072,496 B2
(45) Date of Patent: Jul. 4, 2006

(54) SLAP PRINT SEGMENTATION SYSTEM AND METHOD

(75) Inventors: Peter Zhen-Ping Lo, Lake Forest, CA (US); Pathamadai V. Sankar, Tustin, CA (US)

(73) Assignee: Motorola, Inc., Schaumburg, IL (US)

( * ) Notice: Subject to any disclaimer, the term of this patent is extended or adjusted under 35 U.S.C. 154(b) by 741 days.

(21) Appl. No.: 10/326,458

(22) Filed: Dec. 20, 2002

(65) Prior Publication Data

US 2004/0120555 A1    Jun. 24, 2004

(51) Int. Cl.
G06K 9/00    (2006.01)

(52) U.S. Cl. .................. 382/124; 382/115; 382/125; 340/5.53; 340/5.83

(58) Field of Classification Search .............. 382/124, 382/125; 340/5.53, 5.83
See application file for complete search history.

(56) References Cited

U.S. PATENT DOCUMENTS

| | | |
|---|---|---|
| 3,699,519 A | 10/1972 | Campbell |
| 4,151,512 A | 4/1979 | Riganati et al. |
| 4,225,850 A | 9/1980 | Chang et al. |
| 4,646,352 A | 2/1987 | Asai et al. |
| 4,817,183 A | 3/1989 | Sparrow |
| 4,876,726 A | 10/1989 | Capello et al. |
| 5,548,394 A | 8/1996 | Giles et al. |
| 5,613,014 A | 3/1997 | Eshera et al. |
| 5,625,448 A | 4/1997 | Ranalli et al. |
| 5,650,842 A | 7/1997 | Maase et al. |
| 5,659,626 A * | 8/1997 | Ort et al. ............... 382/125 |
| 5,960,101 A | 9/1999 | Lo et al. |
| 6,282,302 B1 * | 8/2001 | Hara ...................... 382/116 |
| 6,289,112 B1 | 9/2001 | Jain et al. |
| 6,876,757 B1 * | 4/2005 | Yau et al. ............... 382/125 |

OTHER PUBLICATIONS

B. M. Mahtre, "Segmentation of Fingerprint Images Using the Directional Image". Pattern Recognition, vol. 20, No. 4, Pergamon Journals Ltd., 1987, Pattern Recognition Society, Great Britian, pp. 429-435.

* cited by examiner

Primary Examiner—Bhavesh M. Mehta
Assistant Examiner—John Strege
(74) Attorney, Agent, or Firm—A. Kate Huffman; Valerie M. Davis (57) ABSTRACT

A system and a method for segmenting slap fingerprints is described. The method includes providing a print image, optionally pre-processing the print image, detecting at least a plurality of image components of the print image, determining at least one segmentation boundary for the print image, and computing the convex hull of the image components. The orientation, relative orientation and placement of the image components are detected. The zone lines of each component are found and zone areas are defined. The components under the top component of each zone are deleted. The finger numbers are assigned in accordance with the anchor print component, the geometrical relationship among the components. The slap print image is segmented in accordance with the segmentation boundary and its neighboring boundaries.

21 Claims, 7 Drawing Sheets

SLAP PRINT SEGMENTATION SYSTEM AND METHOD

FIELD OF INVENTION

This invention relates generally to providing images of slap prints used in automatic finger print identification systems, and more particularly to a system and method of segmenting regions of the slap prints to provide quality print data.

BACKGROUND

Identification pattern systems, such as ten print or fingerprint and slap print identification systems, play a critical role in modern society in both criminal and civil applications. For example, criminal identification in public safety sectors is an integral part of any present day investigation. Similarly in civil applications such as credit card or personal identity fraud, print identification has become an essential part of the security process.

An automatic fingerprint identification operation normally consists of two stages. The first is the registration stage and the second is the identification stage. In the registration stage, the register's prints and personal information are enrolled and features, such as minutiae, are extracted. The prints, personal information and the extracted features are then used to form a file record that is saved into a database for subsequent print identification. Present day automatic fingerprint identification systems may contain several hundred thousand to several million of such file records.

In the identification stage, print features from an individual, or latent print, and personal information are extracted to form what is typically referred to as a search record. The search record is then compared with the enrolled file records in the database of the fingerprint matching system. In a typical search scenario, a search record may be compared against millions of file records that are stored in the database and a list of matched scores are generated after the matching process. Candidate records are sorted according to matched prints scores. A matched score is a measurement of the similarity of the print features of the identified search and file records. The higher the score is, the more similar the file and search records are determined to be. Thus, a top candidate is the one that has the closest match.

In Automated Fingerprint Identification Systems (AFIS), the fingerprint data is collected in the form of fourteen inked impressions on a traditional tenprint card. This is comprised of the rolled impressions of the ten fingers as well as four slap impressions: the left slap (four fingers of the left hand), the right slap (the four fingers of the right hand) and the thumb slaps (the left and right thumbs). Nowadays these fourteen images are obtained using a Live Scan workstation. Validating the accuracy of such captured prints is generally accomplished by the matching of each rolled or flat finger print against the corresponding finger of a slap print, preferably taken from both hands of the owner, referred to as the rolled to slap comparison or RTS. The validation of this comparison critically depends on the accuracy of the captured data from top regions of the fingers obtained in the slap prints.

To insure proper segmentation, each segmented image must be visually inspected and corrected. The amount of time and energy to manually review an enrolled card in a large AFIS system is a drain on resources that are becoming more stretched as the demand for fast and accurate identification services are required.

In the prior art, the goal of print segmentation is to identify the foreground and background of an image using a single print segmentation algorithm that is limited in its use to single print images and that can not be directly applied to slap print images. Since the enrolled slap prints are often rotated or not oriented properly on the media in which they are captured, a simple top edge center point or the centroid of a component, like the segments detected in prior art methods, do not result in the accurate assignment of the proper finger print number to the detected component. For example, if a right hand slap impression is rotated more than 45 degrees toward the left side of the print, the top edge of the middle fingerprint (finger #3) component may be closer to left side edge of the print than that of the index fingerprint (#2) component. If a right hand slap impression is rotated more than 45 degrees toward to the right side of the print, the top edge of the middle finger (finger #3), and the ring finger (finger #4) may be closer to right side edge of the print than that of the little finger (finger #5). If one uses a rule that finger #5 is most closest to the right side of the print and finger #2 is the most closest to the left side of the print, then the finger numbers will be assigned wrongly when the fingerprint slap impression are rotated as described above.

Thus, it would be desirable to have a system and method that improves the accuracy of data captured from the segments, preferably the top regions, of each finger of the slap prints to compare with other print data in the AFIS system.

BRIEF DESCRIPTION OF THE DRAWINGS

Representative elements, operational features, applications and/or advantages of the present invention reside inter alia in the details of construction and operation as more fully hereafter depicted, described and claimed—reference being had to the accompanying drawings forming a part hereof, wherein like numerals refer to like parts throughout. Other elements, operational features, applications and/or advantages will become apparent to skilled artisans in light of certain exemplary embodiments recited in the detailed description, wherein:

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention.

DETAILED DESCRIPTION OF EXEMPLARY EMBODIMENTS

Images of fingerprints are obtained by the rolled, flat and slap methods, typically using systems such as a Live Scan workstation as described in U.S. Pat. No. 5,960,101; U.S. Pat. No. 4,135,147; and U.S. Pat. No. 6,125,192. Slap prints is a term that generally means a left slap (four fingers of the left hand), a right slap (four fingers of the right hand) and the thumb slaps (the left and right thumbs) applied to an inked media. In AFIS systems, the fingerprint data is collected in the form of fourteen inked impressions (i.e., 10 rolled or flat prints and 4 slap prints) on a traditional print card.

Matching the accuracy of print cards to a database of cards, generally referred to as file records, depends on accurately capturing the prints from fingers and placing the captured prints in the correct orientation and space of the print cards. A preferred way to validate finger print data collection is to obtain a reasonable match score using a match algorithm to compare the captured finger print data of the rolled or flat print card against the corresponding finger print data on the slap card.

In the present invention, the assignment of finger number for each component in the captured print data is based on slap print orientation and the geometric relationship of detected components of the slap prints. For example, for the right hand the slap impression for the index finger (finger #2) is to the left of the slap impression of middle finger (finger #3) in term of orientation, not necessarily based on geometric center of the fingerprint component. For the left hand the slap impression for the index finger (finger #7) is to the right of the slap impression of middle finger (finger #8) in term of orientation. The logic for splitting and merging the components are also determined using intra geometric relationship of slap prints. It is possible that two captured over inked or over wet neighboring fingerprints, due to down sampling or improper thresholding, may be detected as single component. The single component needs to be split correctly. One should not split a component just due to the large width of the detected component. The preferred method for splitting the component depends on the width of the component, the number of components detected and the geometric relationship of the component to the other components. On the other hand, a fingerprint captured, due to uneven pressure, or under inked impression, or excessively dry finger, and also due to down sampling or improper thresholding, may be detected as several components. Whether to merge or delete these components depends on the relationship between each sub component and the rest of the components. Results obtained on about 850 tested print cards using the present invention have shown about a 99.99% accuracy on finger number assignment and about a 99.95% accuracy on segmentation data.

Figure 1:
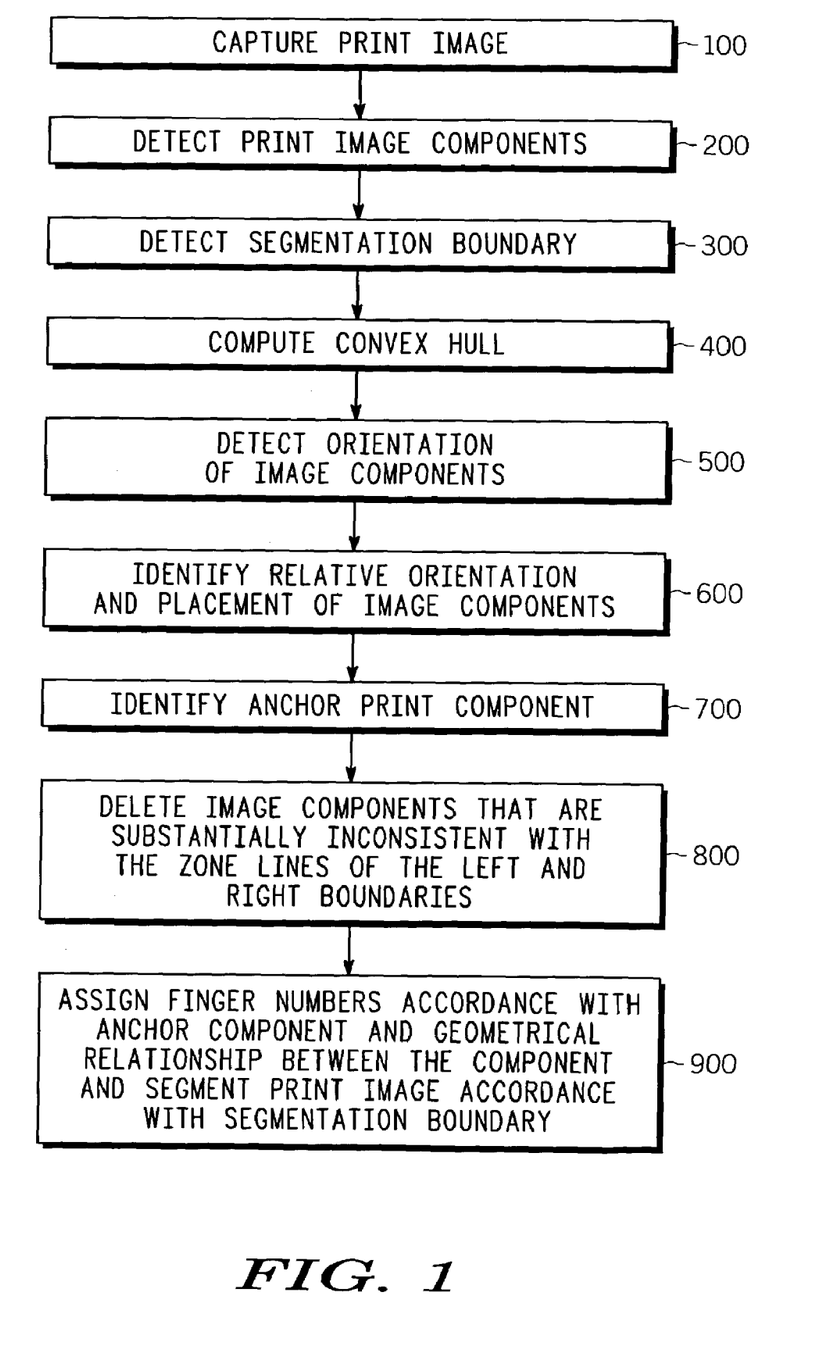
FIG. 1 is a flow diagram illustrating a slap segmentation embodiment according to the invention.
Figure 2:
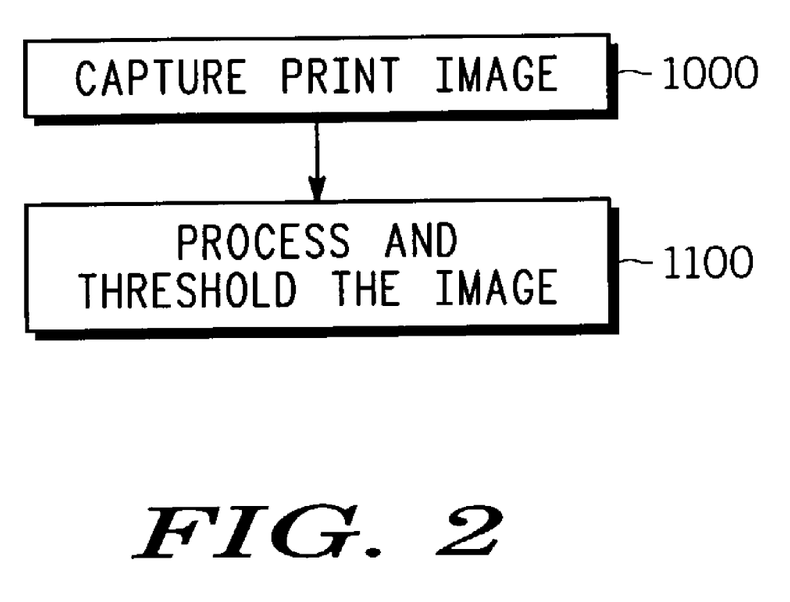
FIG. 2 is a flow diagram illustrating another embodiment of the slap segmentation according to the invention.

FIG. 1 illustrates one embodiment, while FIG. 2 illustrates a second embodiment of the present method. In particular, in step 100 of FIG. 1 print data is captured from an individual by either the rolled or flat and by the slap method, or by scanning a print card, as known in the art.

In block 200, components of the captured finger data, for example the top portion of the finger, the middle portion of the finger and the bottom portion of the finger could each be a distinct component, are detected.

Figure 5:
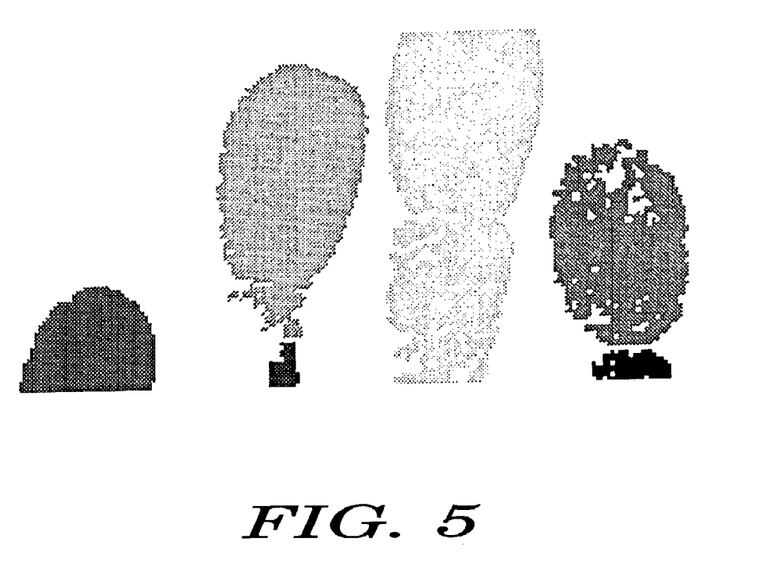
FIG. 5 is an illustration of the detected components in different shades according to the invention.

Image components that are determined to be smaller than a selected threshold value is deleted from the print image. The finial six components of the print were identified in the component detection step 200 are also illustrated in FIG. 5.

Figure 3:
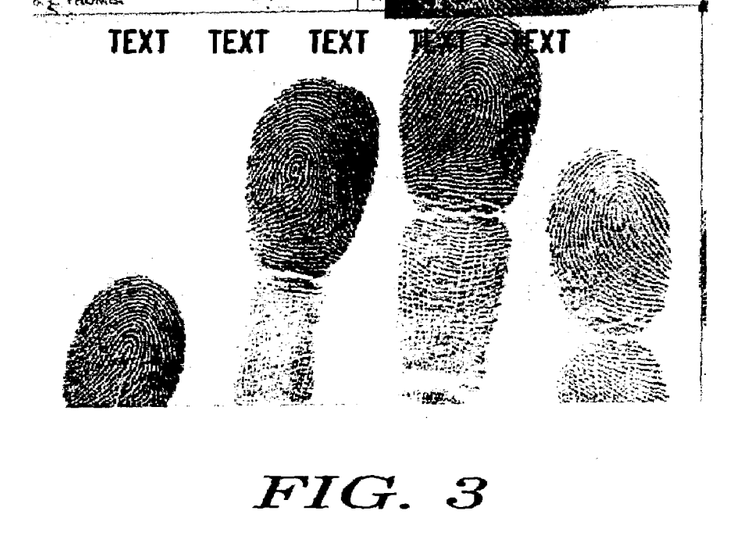
FIG. 3 is a scan of a multi-fingerprint slap image.

In step 300 of FIG. 1, at least three types of processes are used to detect segmentation boundaries in the slap prints of FIG. 3, namely, the detection of connected components, the splitting of weakly connected components in x and y axis directions and the deletion of small component and line shape components. Weakly connected components are defined as those component images having no more than two pixels connecting two components in the image. Line shape component is referred to as a component having width no more than 6 pixels wide. A small component is defined by the number of pixels contained in the component image less than a threshold value T. The selection of T relates to a down sample rate. For example for the illustration of this embodiment T is determined to be 105. Each detected component is step 200 is further characterized by its boundary, central line, component size and component height in the step 300.

Figure 6:
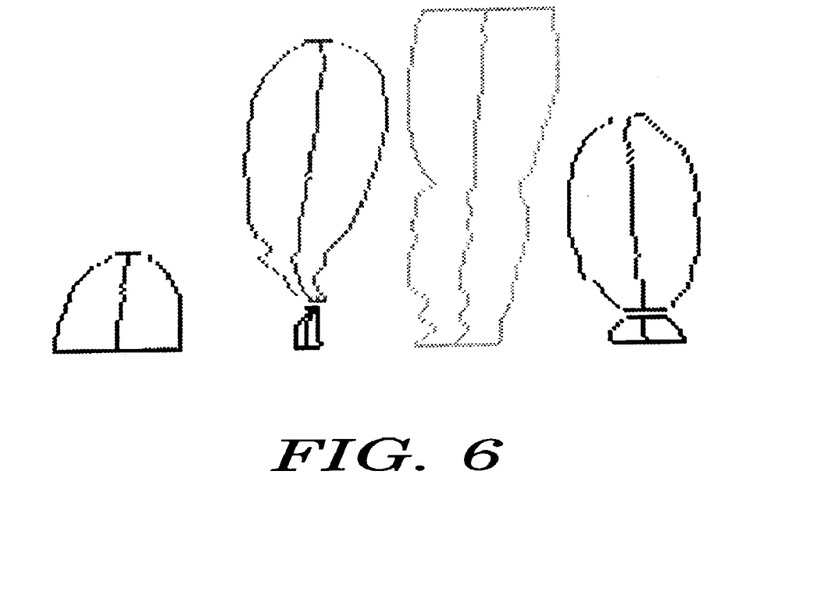
FIG. 6 is an illustration of the boundaries of the detected components according to the invention.

An approximate boundary for each detected component of step 300 is illustrated in FIG. 6. The approximate boundary of each component is found by scanning left to right of each component from top to bottom of each component. The left most from white to black transition cell is the left boundary of the component for that line and the right most from black to white transition cell is the right boundary of the component for that row.

Figure 7:
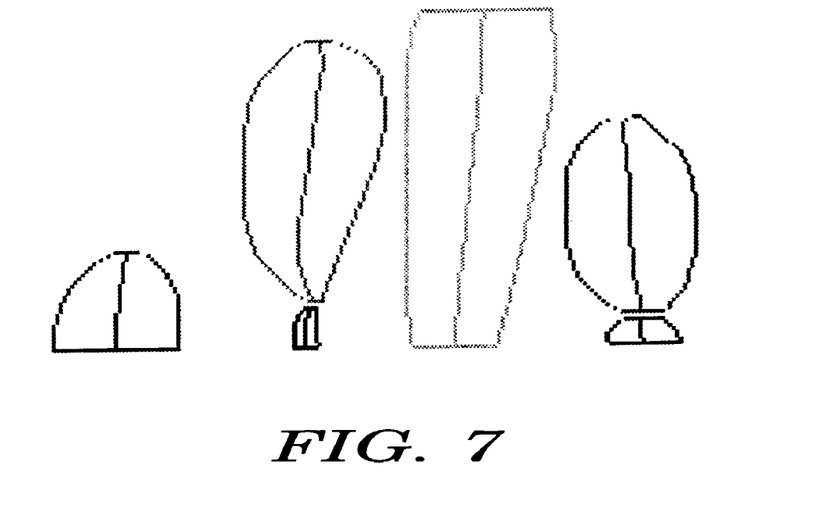
FIG. 7 is an illustration of the detected components having smoothed detected boundaries according to the invention.

The detected boundary from the step 300 is further convexized in step 400 of FIG. 1. The detected components are sorted according to the component size in a descending order; the flat bottom and flat top of each component that were disconnected during the previous processes are detected and merged. Normally the slap print contains black lines and text near the boundaries of the images as shown FIG. 3. These noisy structures may link some independent finger components together as a single component. Thus it is desirable to delete them in the first place. After deleting them, the fingerprint component may be divided into two sub-components. If that was the case, the two sub-components need to be connected. If a flat bottom and a flat top of two components are adjacent to each other in the y direction, i.e., the distance between the bottom of one component to the top of the other component is less than N1 pixels in the y direction, and the distance between the center of the top edge and the center of the bottom edge is less than N2 pixels in the x direction then they are merged. This process is required only if the top edge of a flat top portion of a component is near the edge of the image. In this step, any component whose bottom edge y coordinate is above T is also deleted, and T is defined as the top most y coordinate of the four largest components, in the print image minus N pixels. N1, N2 and N are set to 12, 18 and 10 respectively in the system of invention. The component detected in block 300 due to noise structures and thresholding, the component may not have an appropriate fingerprint component shape. In step 400, the boundaries are convexized. The convex boundaries are computed by considering successive left most pixels (as well as right most pixels) of neighboring rows and identifying whether the slope is increasing or decreasing monotonically (a necessary and sufficient condition for the convex hull). If this condition is violated we adjust the left or right most pixel of the current row to comply with this condition by making it equal to the left most or right most pixel of the current or the previous row. The Convex components are computed as illustrated in FIG. 7.

Figure 8:
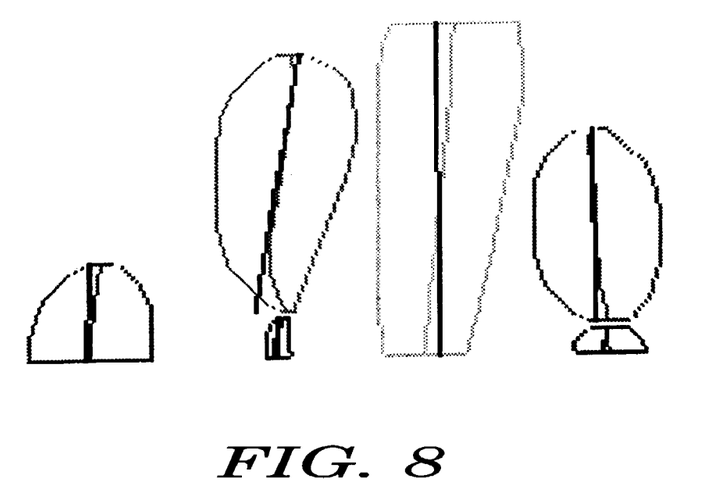
FIG. 8 is an illustration of the convex hull of the components of a multi-finger slap image according to the invention.
Figure 9:
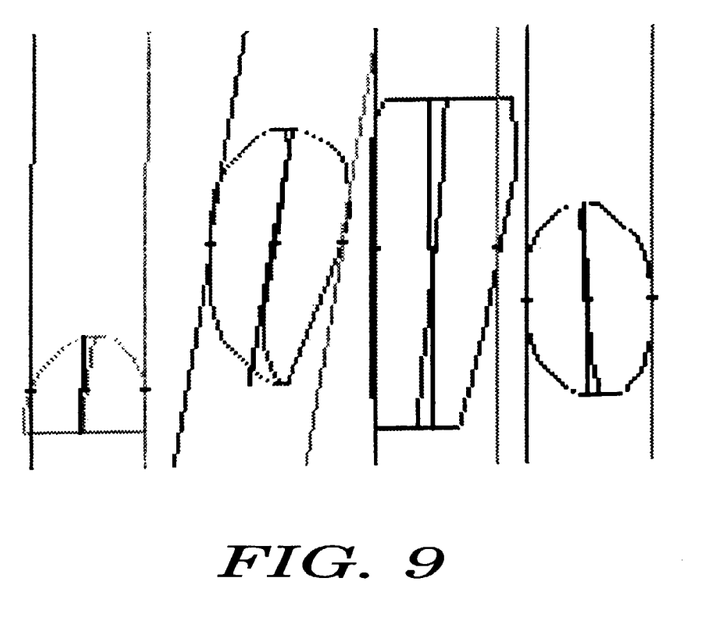
FIG. 9 is an illustration of identified zones of each component of the multi-finger slap image according to the invention.

In step 500 of FIG. 1, the orientation of each component is estimated based on the segmentation boundary of each component detected in step 300 as described above. To estimate the orientation of each component, the center points of left and right boundaries are first found. Based on these points, a central line is estimated as shown in FIG. 8. The orientation of the component is the slope of the estimated line. In step 600 of FIG. 1, each component orientation maybe further adjusted by determining an average orientation of the four largest components of the slap print, for example, using a formula such as newDi=avgD+a*(oldDi−avgD). Where a is between 0 and 1, newDi is the new orientation, avgD is the average orientation and oldDi is the previous orientation. The orientation of each component in the slap print image is represented by a central line drawn through each component as illustrated in FIG. 9.

Any non-relevant components that are identified as positioned further right or left on the print image should be deleted or merged. A rule of thumb to delete or merge these components is based on the size, width and the geometric relationship between the component to the other components.

In step 700 of FIG. 1 an anchor print component is detected. An anchor component is defined as the finger component located left most or right most in terms of the hand orientation; also it must satisfy the following constraints: (a). its distance to neighboring finger components increases in ascending order; (b). the relative angle from anchor component to neighboring components increases in ascending order; (c). the size and the width of the component should be greater than pre-defined size and width thresholds. The anchor component and the components, which meet the three constraints, are marked for further evaluation in later section.

To further determine image components that are substantially inconsistent with the determined left and right boundaries of the components of the print image, at least two zone lines are placed at a left and a right boundary of each component in the print image. Each zone line should have substantially the same direction and orientation as the central line. Only a top component which is in the top of the zone lines and was marked in previous section is maintained, the rest of the components in the same zone are deleted.

FIG. 9 illustrates the deletion of two components that had been present earlier in the process as illustrated in FIG. 8.

Preferably, components are subsequently split or merged depending on their sizes, their widths, their orientation and relative placement relative to each neighbor zone component. If a single component is actually comprised of two finger segments, then the boundary of the components will have two distinct humps at the top and the bottom and will connect in the middle. This will be a clear indication that this component needs to be split. Also the size of the component will be much larger than the average size of a component. If the width of the component is greater than a threshold value Tw, it is preferable to split a component's width into two components from the middle central line of the components. Tw is set to 58 in our system of invention.

Figure 10:
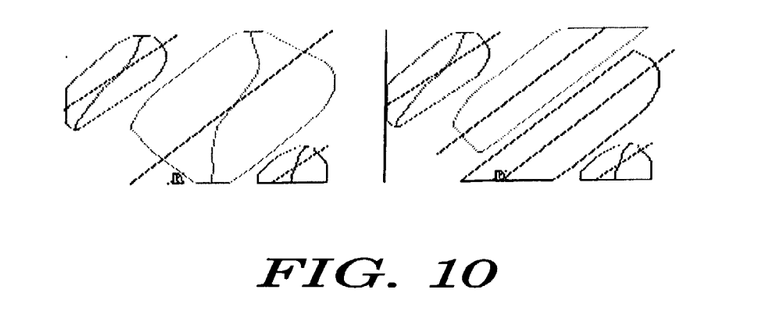
FIG. 10 is an illustration of the splitting of the components of the multi-finger slap image according to the invention.

In FIG. 10 a larger component that has been split into two components is illustrated.

In the inventive process, adjacent components are also reviewed to determine if they are in the correct proximity or closeness to each other. This is done by checking the distance between two central lines of neighbor components and the distance between left boundary of right component and right boundary of left component. Based on the size of the component (total number of pixels in the component) and the distances detected, the components are merged or deleted.

Figure 11:
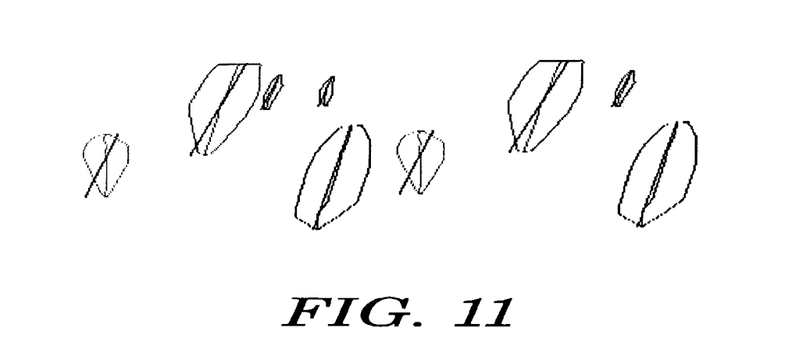
FIG. 11 is an illustration of a component deletion or merger based on relative placement, according to the present invention.

FIG. 11 shows two adjacent components that were determined to be too close to each other in the left half of the print image and the smaller of the two components was deleted. The larger of the two components was placed at the center of two components in the right half of the image. An alternative way is to connect/merge the two components to a single component.

In step 800 of FIG. 1, image components that are substantially inconsistent with the segmentation boundary distribution of the slap print image are deleted. Such components are identified by using one or more of the following criteria: determine whether the left most and the right most components of a slap print orientation satisfy print and slap geometrical orientation constraints, that is, determine that the components are not too small, that a component is not too close to an adjacent component and exists correct direction of print orientation, and that the components satisfy position constraints.

The term position constraints refers to the expected positions of each of the four fingers and thumb of each hand relative to an adjacent finger of the hand. Fingers are conventionally numbered as positions 5 and 10 (small finger on left and right hands, respectively), positions 4 and 9 (ring fingers), positions 3 and 8 (middle fingers), position 2 and 7 (index fingers) and positions 1 and 6 (thumbs). In expected finger positions, finger 5 is lower than finger 4, finger 2 is lower than finger 3, finger 10 is lower than finger 9 and finger 7 is lower than finger 8 in hand orientation.

If one or more of these criteria are not satisfied, component that does not satisfy the criteria may need to be deleted, merged or-replaced by its neighboring component which was deleted before: in blocks 500, 600, 700 and 800. Following this selected action, the orientation and position of the components and the anchor component should be re-evaluated. The process may need to be done several times until these criteria are satisfied.

In step 800, inconsistent components are further identified by connecting the two top center points of the left most and the right most components components (two anchor components) and deleting any components which are below the connected lines. If there are more than four components in the slap print image, the four largest components are preferably selected for further processing and the remaining components are deleted from the print image.

The components are sorted left to right based on fingerprint orientation. If four components are detected, assign 2, 3, 4 and 5 finger index to each component from left to right if the slap image is from right hand and assign 10, 9, 8 and 7 finger index to each component form left to right if the slap image is from left hand. If less than four components are detected, the relative distance between the tips of neighboring components and the distance between the central line of neighboring components are used to determine the individual finger numbers. For example, if only three components are detected on the left hand, the central line of left most component to the central line of the neighboring component is twice the distance to the pairs of the other component. The tip of the neighboring component of the left most component is higher than that of the left most component. The tip of the right most component is shorter than or almost the same height as the tips of the neighboring component and higher than the tip of the left most component. Then 10, 8 and 7 are assigned to the components from left to right. Finger number assignment is completed as described above. Remaining components are resized based on the detected component information of step 300.

To resize components in step 900, the following properties of the components, flat top width, component height and component width are validated. (The flap top width is defined as the number of pixels from the left most pixel to the right most pixel of the boundary along the row that contains the top flat. If, for example, a component exhibits a flat top, the top of the component should be augmented by a curved region of radius half the width of the flat top.

If the component image exhibits a length that is less than the desired segmented length, the length of the component image should be extended in both the top and the bottom directions until these lengths equal the length of the segment.

If the width of each component image is smaller than the desired segment width, the widths should be extended to the left and right boundaries until the widths equal the desired segment width, or the width reaches an adjacent boundary.

Figure 12:
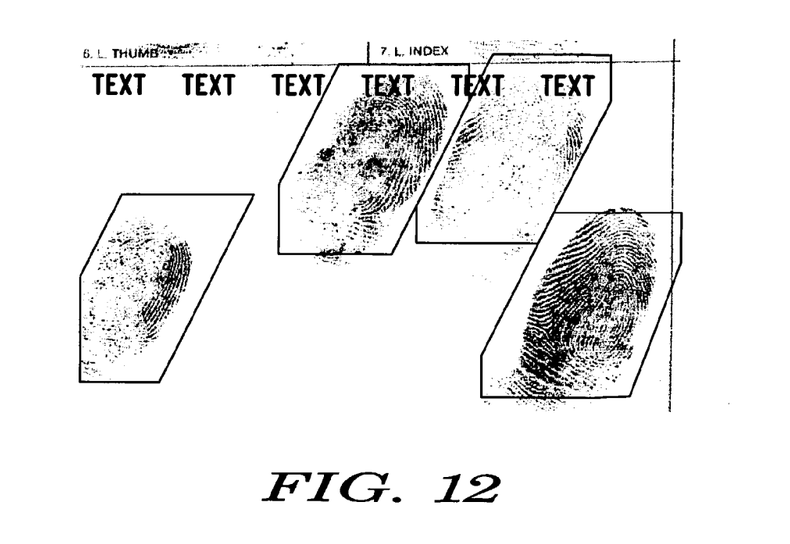
FIG. 12 is an-illustration of a segmented slap image of a multi-finger slap image according to the invention.

In step 900 of FIG. 1, a down sampled boundary is converted into an original image space boundary and each finger print is segmented from the print image to create a segmented slap image print as shown in FIG. 12. (To convert the down sampled boundary into original image space, first the boundary points (coordinates) of the components are converted back to the original image scale by multiplying the scale factor; then these boundary points are used to interpolate the rest of boundary points in original image.

In the exemplary embodiment of the invention illustrated in FIG. 2, the slap print image is captured in step 1000.

Figure 4:
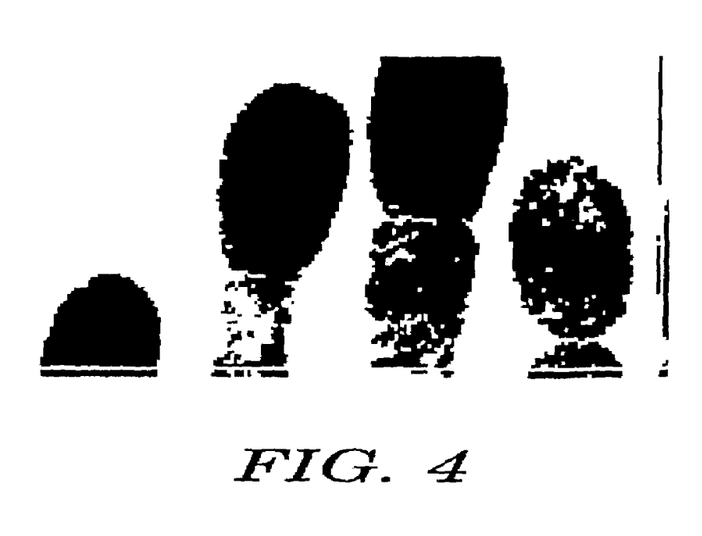
FIG. 4 is an illustration of a down sampled threshold image of a multi-finger slap image according to the invention.

An example of slap print data resulting from the capturing step of block 1000 is illustrated in FIG. 3. This slap image typically has a resolution of 500 dpi and is 1600 pixels×1000 pixels in size. The image typically has 256 gray levels. In step 1100, a copy of the image may be preferably down sampled from 8 to 1 and quantized into gray levels having a preferred range of 16 to 64, more preferably 32 to 64, to increase process speed. A local mean and dynamic range is calculated for each 13×13 window across the entire slap sample and the image is quantized. A global mean for the entire image is also calculated. The processed image is binarized by comparing each pixel of the processed image with the local mean, dynamic range and global mean are compared of that pixel against four threshold values to binarize the processed image. An other preferred method to obtain a binary image of the print image is to find a smooth direction image from the down sampled image. The direction pixel of an image can be calculated based on gradient of two neighbor pixels in x and y direction. However, the magnitude and orientation of the gradient vector estimated may not be reliable since the neighbor pixel may be in a noisy area. In order to obtain a reliable estimation for that pixel or that block, the method in the U.S. Pat. No. 4,151,512 can be used. A preferred method to estimate the block direction is as the followings: that is the direction is found out by calculating the average direction of a given n×n pixel window for that pixel. If no direction is found, a larger size window, for example 4 n×n cells, can be used to find the direction. If still no direction is found, a larger size, for example 16 n×n cells, can be used estimate the direction of that pixel. This pyramid multi-layer type of approach can reliably estimate and smooth the direction. The resulting processed and binary slap print images are illustrated in FIG. 4.

Background noise such as extraneous print lines, printed letters, smudges, etc near the boundary of the slap print are detected by profiling the area bordering the binary image referred to as the boundary area. Detected noise is deleted from the slap image. The processed binary print image then used to feed to block 200 to detect the component of the print image.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

Similarly, the software elements of the present invention may be implemented with any programming or scripting language such as, for example, C, C++, Java, COBOL, assembler, PERL, eXtensible Markup Language (XML), etc., or any programming or scripting language now known or hereafter derived in the art, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneider entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

It will be appreciated, that many applications of the present invention could be formulated. One skilled in the art will appreciate that the network may include any system for exchanging data, such as, for example, the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (i.e., Palm Pilot®), cellular phone and/or the like. Similarly, the invention could be used in conjunction with any type of personal computer, network computer, workstation, minicomputer, mainframe, or the like running any operating system such as any version of Windows, Windows XP, Windows Whistler, Windows ME, Windows NT, Windows2000, Windows 98, Windows 95, MacOS, OS/2, BeOS, Linux, UNIX, or any operating system now known or hereafter derived by those skilled in the art. Moreover, the invention may be readily implemented with TCP/IP communications protocols, IPX, Appletalk, IP-6, NetBIOS, OSI or any number of existing or future protocols. Moreover, the system contemplates the use, sale and/or distribution of any goods, services or information having similar functionality described herein.

The computing units may be connected with each other via a data communication network. The network may be a public network and assumed to be insecure and open to eavesdroppers. In one exemplary implementation, the network may be embodied as the internet. In this context, the computers may or may not be connected to the internet at all times. Specific information related to data traffic protocols, standards, and application software utilized in connection with the Internet may be obtained, for example, from DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); LOSHIN, TCP/IP CLEARLY EXPLAINED (1997). All of these texts are hereby incorporated by reference. A variety of conventional communications media and protocols may be used for data links, such as, for example, a connection to an Internet Service Provider (ISP) over the local loop as is typically used in connection with standard modem communication, cable modem, Dish networks, ISDN, Digital Subscriber Line (DSL), or various wireless communication methods. Polymorph code systems might also reside within a local area network (LAN) which interfaces to a network via a leased line (T1, T3, etc.). Such communication methods are well known in the art, and are covered in a variety of standard texts. See, i.e., GILBERT HELD, UNDERSTANDING DATA COMMUNICATIONS (1996), hereby incorporated by reference.

As will be appreciated by one of ordinary skill in the art, the present invention may be embodied as a method, a system, a device, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage-devices, magnetic storage devices, and/or the like.

Data communication is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by merely the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical". Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing or design parameters or other operating requirements without departing from the general principles of the same.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "set of instructions", as used herein, is defined as a sequence of instructions designed for execution on a microprocessor or computer system. A program or set of instructions may include a subroutine, a function, a procedure, an object method, an object implementation, an executable application, an applet, a servlet, a source code, an object code, a shared library/dynamic load library and/or other sequence of instructions designed for execution of a computer system.

We claim:

1. A method for segmenting prints, said method comprising the steps of:
   providing a print image;
   thresholding the print image;
   detecting at least a plurality of image components of said print image;
   determining at least one segmentation boundary for said print image;
   computing the convex hull of said image components;
   detecting the orientation of said image components;
   identifying the relative orientation and placement of said image components;
   deleting image components which are substantially inconsistent with the zone lines of said segmentation boundary;
   identifying an anchor component and deleting or merging image components in accordance with geometric relationships among the components;
   assigning a finger number in accordance with said anchor print component; and
   segmenting said print image in accordance with said segmentation boundary.

2. The method for segmenting prints of claim 1, further comprising the step of modifying said print image components in accordance with at least one of merging small image components and dividing large image components.

3. The method for segmenting prints of claim 1, preprocessing said print image wherein said step of preprocessing said print image comprises at least one of down sampling and thresholding said print image.

4. The method for segmenting prints of claim 3, wherein said print image is down sampled by a factor of about 1:8.

5. The method for segmenting prints of claim 4, further comprising the step of applying at least a plurality of threshold values based on gray-level statistics of said down sampled image.

6. The method for segmenting prints of claim 5, wherein said gray-level is quantized from about 256 gray-levels to about 64 gray-levels.

7. The method for segmenting prints of claim 5, wherein said down sampled image is converted to a binary image in accordance with at least a plurality of threshold values.

8. The method for segmenting prints of claim 7, wherein said plurality of threshold values are determined from said down sampled image.

9. A method for segmenting prints of claim 1, wherein said step of determining said segmentation boundary further comprises the steps of:
   determining a left side boundary;
   determining a right side boundary;
   determining a central line with respect to said left side boundary and said right side boundary; and
   determining a height and width of the component.

10. The method for segmenting prints of claim 1, further comprising the step of sorting print image components according to component size.

11. The method for segmenting prints of claim 1, further comprising the steps of at least one of determining and merging at least one of flat bottom and flat top image components if said flat components are substantially adjacent to each other.

12. A method for print image component processing, said method comprising the steps of:
   providing a print image;
   providing an image component threshold value;
   detecting at least a plurality of image components of said print image;
   splitting weakly connected components in the plane of said print image;
   deleting discrete feature components smaller than said image component threshold value;
   deleting any boundary line shape components corresponding to said deleted discrete feature components; and
   defining weakly connected image components in accordance with pixel proximity; and
   deleting image components which are substantially inconsistent with the zone lines of said segmentation boundary;
   identifying an anchor component and deleting or merging image components in accordance with geometric relationships among the components;
   assigning finger number in accordance with the anchor print component; and
   segmenting said print image in accordance with said segmentation boundary.

13. The method for print image component processing of claim 12, further comprising the step of modifying said print image components in accordance with at least one of merging small image components and dividing large image components.

14. The method for print image component processing of claim 12, preprocessing print image wherein said step of pre-processing said print image comprises at least one of down sampling and thresholding said print image.

15. The method for print image component processing of claim 12, wherein weakly defined image components are in the proximity of at least about two pixels.

16. The method for print image component processing of claim 12, wherein line shape defined image components are in the proximity of at least about six pixels width.

17. The method for print image component processing of claim 12, further comprising the step of sorting image components left to right in terms of the print orientation.

18. The method for print image component processing of claim 12, further comprising the step of determining whether a subset of print image components satisfy selection criteria based on at least one of size of image components, proximity of image components and location of image components.

19. The method for print image component processing of claim 18, further comprising the steps of:
   connecting the top central point of a left most image component and the top central point of a right most image component to produce a connecting line;
   deleting image components below said connecting line; and
   optionally at least one of deleting and merging remaining image components.

20. A method for segmenting finger prints, said method comprising the steps of:
   providing a finger print image;
   down sampling said finger print image;
   applying at least a plurality of threshold values based on gray-level statistics of said down sampled image to produce a binarized image;
   converting said threshold image to a binary image in accordance with at least a plurality of threshold values;
   detecting at least a plurality of image components of said binary image;
   modifying said finger print image components in accordance with at least one of merging small image components and dividing large image components;
   determining a left side segmentation boundary;
   determining a right side segmentation boundary;
   determining a center position with respect to said left side segmentation boundary and said right side segmentation boundary;
   determining a segmentation column position;
   computing the convex hull of said image components;
   detecting the orientation of said image components;
   identifying the relative orientation and placement of said image components;
   deleting image components which are substantially inconsistent with the zone lines of said segmentation boundary;
   identifying an anchor component and deleting/merging image components in accordance with geometric relationships among the components;
   assigning a finger number in accordance with the anchor print component; and
   segmenting said print image in accordance with said segmentation boundary.

21. A system for segmenting finger prints, said system comprising:
   means for providing a finger print image;
   means for down sampling said finger print image;
   means for applying at least a plurality of threshold values based on gray-level statistics of said down sampled image to produce a threshold image;
   means for converting said threshold image to a binary image in accordance with at least a plurality of threshold values;
   means for detecting at least a plurality of image components of said binary image;
   means for modifying said finger print image components in accordance with at least one of merging small image components and dividing large image components;
   means for determining a left side segmentation boundary;
   means for determining a right side segmentation boundary;
   means for determining a center position with respect to said left side segmentation boundary and said right side segmentation boundary;
   means for determining a segmentation column position;
   means for computing the convex hull of said image components;
   means for detecting the orientation of said image components;
   means for identifying the relative orientation and placement of said image components;
   means for deleting image components which are substantially inconsistent with the zone lines of said segmentation boundary; and
   means for identifying an anchor component and deleting/merging image components in accordance with geometric relationships among the components;
   means for assigning a finger number in accordance with the anchor print component; and
   means for segmenting said print image in accordance with said segmentation boundary.

* * * * *

UNITED STATES PATENT AND TRADEMARK OFFICE
CERTIFICATE OF CORRECTION

PATENT NO. : 7,072,496 B2  Page 1 of 1
APPLICATION NO. : 10/326458
DATED : July 4, 2006
INVENTOR(S) : Lo et al.

It is certified that error appears in the above-identified patent and that said Letters Patent is hereby corrected as shown below:

In Claim 14, column 12, line 67, delete "preprocessing print image"

Signed and Sealed this

Twenty-fourth Day of April, 2007

JON W. DUDAS
*Director of the United States Patent and Trademark Office*